Jan. 29, 1952　　　A. B. DARVILL　　　2,583,634
VEHICLE WHEEL AND ATTACHMENT THEREFOR
Filed Feb. 28, 1948　　　　　　　　　　　　2 SHEETS—SHEET 1

INVENTOR.
ALEC BISHOP DARVILL.
BY
*Wisner & Sloman*
ATTORNEY.

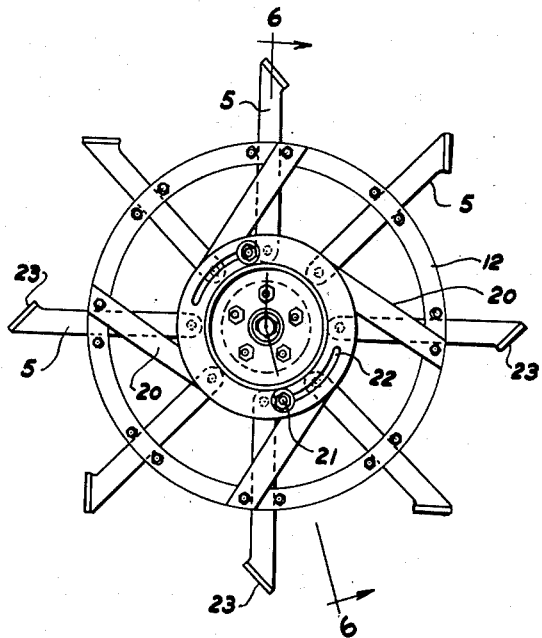
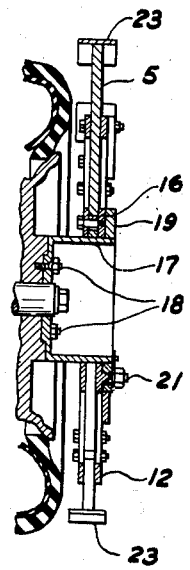
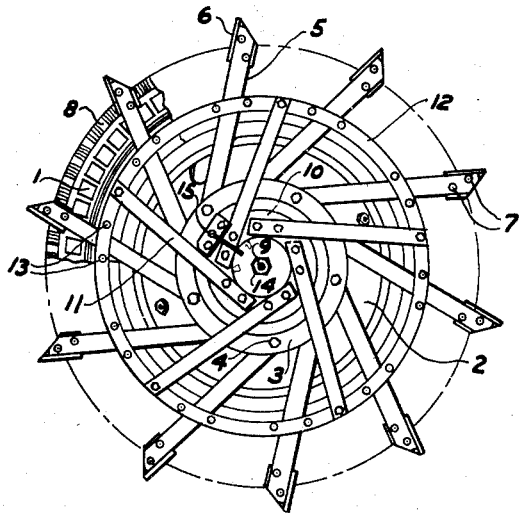
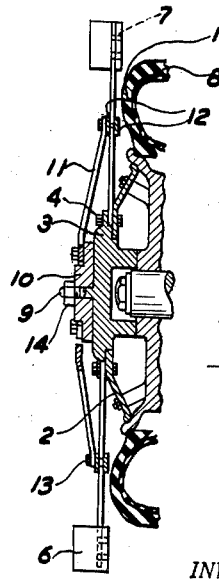

Patented Jan. 29, 1952

2,583,634

UNITED STATES PATENT OFFICE 2,583,634

VEHICLE WHEEL AND ATTACHMENT THEREFOR

Alec Bishop Darvill, Buckinghamshire, England

Application February 28, 1948, Serial No. 12,005
In Great Britain February 8, 1944

Section 1, Public Law 690, August 8, 1946
Patent expires February 8, 1964

6 Claims. (Cl. 301—47)

This invention relates to an attachment for vehicle wheels to enable them to obtain a good grip when passing over soft surfaces.

Numerous prior proposals have been made in which retractable spuds are fitted on to or in the wheel and are controlled by a central rotatable hub, the legs of the spud being pivoted to the central rotatable hub and passing through or being movably pivoted to a fixed annular ring or plate at a point close to the periphery of the wheel. In order to operate these devices and owing to the small leverage obtainable on the central rotatable member special tools have to be provided to enable the necessary leverage to be exerted to extend or retract the spuds or strakes.

An object of the present invention is to provide apparatus for incorporating into or attachment to vehicle wheels in which retractable spuds may be moved from the retracted to the extended position and vice versa easily and without the use of any special tools. Furthermore it is an object of the invention to provide in such an attachment a construction whereby the leverage exerted by the strakes as they enter the ground to operate the apparatus to retract the strakes is considerably smaller than in existing devices.

According to the present invention a device for attachment to or incorporation into vehicle wheels adapted to retract and extend strakes or like members below or beyond the normal periphery of the wheel comprises a central member adapted to be fixedly secured in relation to the wheel, a plurality of strake members pivoted to the said fixed member, and an outer member preferably in the form of an annulus which is rotatable with respect to the wheel and which engages the strakes in slidable relationship so as to permit the said strakes to be pivoted on the fixed central plate and to be retracted or extended below or beyond the normal periphery of the wheel.

Preferably the outer member is in the form of an annulus. This annulus may comprise a double ring having spaced pins or bolts between which the strakes pass. Conveniently this annulus is fixedly secured to a central plate which is rotatable with respect to the fixed central member and against which it is locked by any convenient means to hold the strakes in position. It is preferred to enable the strakes to be retracted from the extended position by rotation of the outer rotatable member in either direction. This permits these strakes then to be retracted by releasing the central member from the central fixed member and driving the vehicle either backwards or forwards.

The invention will now be described with reference to the accompanying drawings in which:

Figure 3 shows the strakes partially retracted in the opposite direction.

Figure 4 shows a section on the line 4—4 of Figure 1.

Figure 5 shows another modification of the invention, and

Figure 6 is a section on the line 6—6 of Figure 5.

Figure 1:
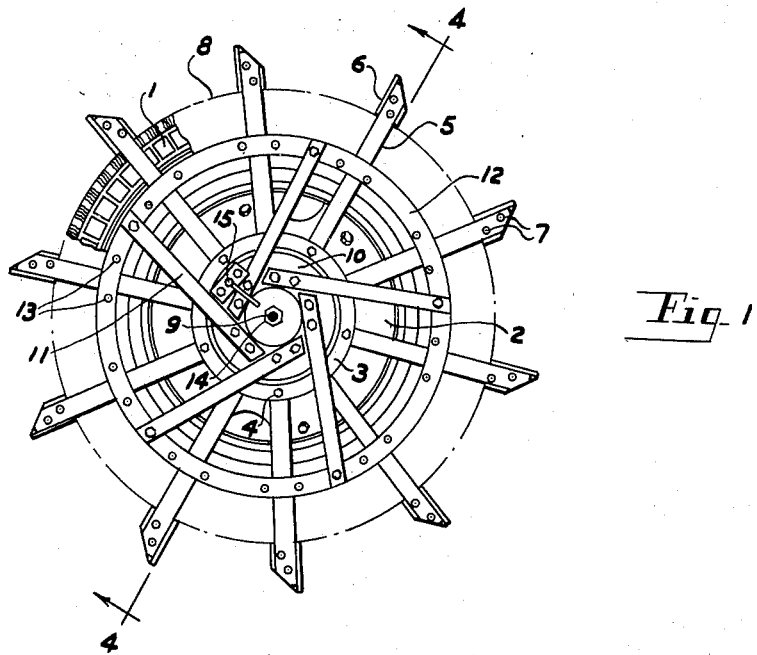
Figure 1 shows an appliance according to the present invention secured to a tractor wheel.

The appliance shown in the accompanying drawings is attached to a tractor driving wheel 1. Fixedly secured to the disc 2 of the wheel is a circular plate 3. This plate is secured by means of fixing bolts 4 which pass into the disc 2 of the wheel and which at the same time serve as pivots for strakes 5. These strakes are provided with spade ends 6 which may either be welded on to the strake ends or which may be detachably secured as for example by rivets 7. The length of the strakes is such that when extending radially from the plate 3 the spade ends 6 extend beyond the periphery of the tyre 8.

Figure 2:
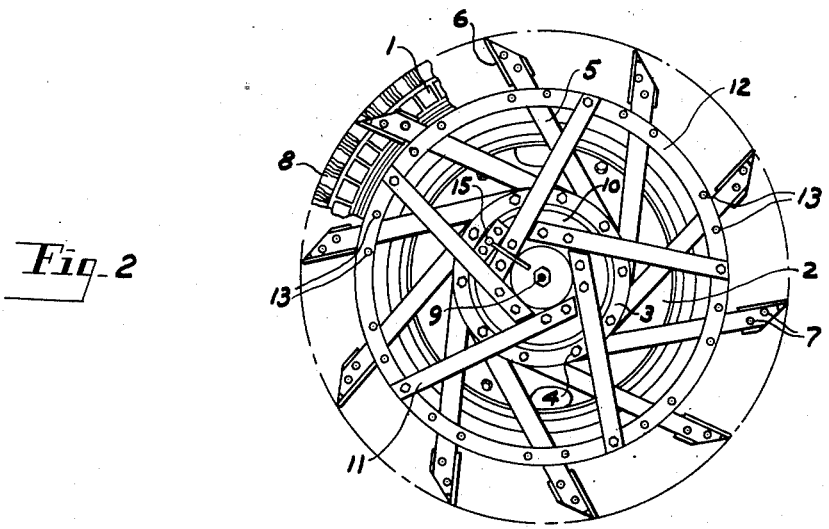
Figure 2 shows the wheel with the strakes fully retracted.

Extending from and integral with the plate 3 is a shaft 9 axially arranged with the axis of the wheel. Rotatably mounted upon this shaft 9 is a hub member 10. Tangentially mounted on the hub member 10 are a number of fixedly secured arms 11. These arms support a double ring member 12 close to the periphery of the wheel 1. The strakes 5 pass through the double ring 12 and each is located between two guide pins 13. It will be evident that on rotation of the ring 12 the strakes will be pivoted from the radially disposed extended position shown in Figure 1 to the retracted position shown in Figure 2 on turning the ring anti-clockwise and retracted to lie in the direction shown in Figure 3 if the ring be rotated clockwise.

To lock the strakes in any desired position either fully retracted or fully extended or any intermediate position a locking nut 14 is provided upon the threaded end of the shaft 9 which forces the hub 10 firmly into engagement with the plate 3. In addition to this locking nut a locking pin 15 may be mounted upon the plate 3 to engage with one of a number of apertures (not shown) in the hub 10. Thus these apertures may be so arranged to lock the strakes in fully extended position, in the fully retracted position in either direction, and if desired in an intermediate position; for example that shown in Figure 3. Any other position of the strakes may be obtained by means of a locking nut 14.

It will be observed that the present invention differs from prior constructions in that it is the ring 12 which rotates to operate the strakes and not the plate 3. This construction has many advantages over the prior constructions one of the chief advantages being that the strakes are easily manipulated by hand owing to the greater leverage obtained on the ring 12 than on a central rotatable plate as in the prior proposals. A further advantage lies in the fact that the leverage exerted by the strakes upon the ring 12 to rotate it and thus to retract the strakes is considerably less and consequentially the strain on the appliance as a whole is lessened. A further advantage of the appliance is that the strakes may be retracted in either direction, that is to say in the direction shown in Figure 2 or in the direction shown in Figure 3. This feature is of considerable importance because it may not always be advantageous or even possible to drive the tractor in one direction to retract the strakes. All that is needed in the present case to retract the strakes is for the locking pin 15 to be disengaged from the hub 10 and the locking nut 14 to be slackened. By driving the tractor forward or backward a turning movement is imparted to the ring 12 which thus causes the strakes to pivot about the pins 4 until pressure is no longer put on to the strakes or spades.

Whilst the spades 6 as shown are formed from pieces of angle metal bevelled off to a point it will be appreciated that they may take any other form and conveniently they may embody a hollow member which fits over the end of the strake in position to be secured in position by a nut and bolt passing through the spade and the strake.

The plate 3 may have a configuration to fit any particular wheel and where fixing bolts are provided for securing the wheel on to the vehicle hub the plate 3 may be provided with corresponding apertures so that these bolts also serve to secure the plate 3 to the wheel.

Another modification is shown in Figures 5 and 6. In this construction the strakes 5 are pivoted upon an annular member 16 which is integral or fixedly secured to a centre tube 17 secured to the wheel hub by bolts 18. The tube 17 is open at its outer end thus giving free access to the axle of the tractor or other vehicle.

Rotatably mounted upon the wheel tube 17 is a ring member 19 which carries arms 20 supporting the ring 12.

The ring member 19 can be adjusted and locked in position by means of a pair of bolts 21 which each work in a slot 22 in the ring member 19 so that with the bolt at one end of the slot the strakes are fully retracted and at the other end of the slot the strakes are fully extended as shown in Figure 5.

Conveniently the spade ends 23 of the strakes 5 are inclined so as to assist in the gripping action and to render them self-cleaning.

What I claim is:

1. In combination with a vehicle wheel, a central member secured thereto, a plurality of radially spaced outwardly extending strakes pivotally joined to said member at their inner ends, an outer annular member rotatable relatively to said wheel slidably and retainingly engaging intermediate portions of said strakes for pivoting the same to effect alternately retractions of the outer ends of said strakes below and extensions thereof beyond the periphery of the wheel, and a hub rotatably mounted upon said central member coaxial of said wheel axis, means rigidly securing said hub to said annular member, and means for securing said hub in selected positions of adjustment.

2. In combination with a vehicle wheel, a central member secured thereto, a plurality of radially spaced outwardly extending strakes pivotally joined to said central member at their inner ends, an outer annular member rotatable relatively to said wheel slidably and retainingly engaging intermediate portions of said strakes for pivoting the same to effect alternately retractions of the outer ends of said strakes inwardly of and extensions thereof beyond the periphery of the wheel, a bolt extending from said central member axially thereof, a hub rotatably mounted upon said bolt concentric with the wheel axis, a plurality of diagonally disposed arms extending between and rigidly secured at their ends to said annular member and said hub, and a nut screwed upon said bolt and gripping said hub when tightened to releasably secure the hub and the annular member in turned positions of adjustment.

3. In combination with a vehicle wheel, a central member secured thereto, a plurality of radially spaced outwardly extending strakes, pivotally joined to said member at their inner ends, a pair of spaced annular members rotatable relative to said wheel, spaced pair of locating pins interconnecting said annular members, with intermediate portions of said strakes being slidably and retainingly engaged between a pair of said pins whereby rotation of said annular member will effect extension or retraction of the outer ends of said strakes relative to the wheel periphery, a hub rotatably mounted upon said central member coaxial with said wheel axis, and a plurality of angularly related arms joined to and interconnecting said annular members and said hub.

4. In combination with a vehicle wheel, a central member secured thereto, a plurality of radially spaced outwardly extending strakes pivotally joined to said member at their inner ends, an outer annular member rotatable relatively to said wheel slidably and retainingly engaging intermediate portions of said strakes for pivoting the same to effect alternately retractions of the outer ends of said strakes and extensions thereof beyond the periphery of the wheel, a hub rotatably mounted upon said central member coaxial of said wheel axis, a plurality of angularly related arms extending between and rigidly secured at their ends to said annular member and said hub, said annular member being rotatable in either direction to retract or extend said strakes, and means for releasably securing said hub against turning movement.

5. In combination with a vehicle wheel, a wheel tube open at its outer end secured to the wheel hub, an annular member secured upon said tube, a plurality of radially spaced strakes pivotally joined at their inner ends to said annular member, a second annular member of greater diameter and concentric with said first annular member, means on said second annular member slidably and retainingly engaging intermediate portions of said strakes, a third member rotatably mounted upon said tube, and angularly related arms joined to and interconnecting said third member and said second annular member.

6. In combination with a vehicle wheel, an annular member coaxial with and secured to said wheel, a plurality of radially spaced strakes pivotally joined at their inner ends to said annular member, a second annular member of greater diameter and concentric with said first annular member, means on said second annular member slidably and retainingly engaging intermediate portions of said strakes, a third slotted member rotatably mounted upon said annular member and connected to said second annular member, a plurality of bolts carried by said first annular member and projecting through said slots, and locking nuts on their outer ends.

ALEC BISHOP DARVILL.

REFERENCES CITED

The following references are of record in the file of this patent:

UNITED STATES PATENTS

| Number | Name | Date |
|---|---|---|
| 1,589,821 | Sillery | June 22, 1926 |
| 2,032,293 | Maxwell | Feb. 25, 1936 |

FOREIGN PATENTS

| Number | Country | Date |
|---|---|---|
| 108,155 | Australia | Aug. 2, 1939 |
| 567,833 | Great Britain | Mar. 5, 1945 |